（12）United States Patent
de Perthuis et al.

(10) Patent No.: US 11,812,274 B2
(45) Date of Patent: Nov. 7, 2023

(54) METHODS AND SYSTEMS FOR COMMITTING TRANSACTIONS UTILIZING RF RANGING WHILE PROTECTING USER PRIVACY

(71) Applicant: NXP B.V., Eindhoven (NL)

(72) Inventors: Hugues Jean Marie de Perthuis, Garcelles (FR); Frank Leong, Veldhoven (NL); Sören Heisrath, Kaltenkirchen (DE); Srivathsa Masthi Parthasarathi, Bangalore (IN)

(73) Assignee: NXP B.V., Eindhoven (NL)

( * ) Notice: Subject to any disclaimer, the term of this patent is extended or adjusted under 35 U.S.C. 154(b) by 86 days.

(21) Appl. No.: 17/302,275

(22) Filed: Apr. 29, 2021

(65) Prior Publication Data

US 2021/0377741 A1    Dec. 2, 2021

(30) Foreign Application Priority Data

May 28, 2020   (EP) ................................ 20290048

(51) Int. Cl.
*H04W 60/04*   (2009.01)
*H04W 12/64*   (2021.01)
(Continued)

(52) U.S. Cl.
CPC ......... *H04W 12/64* (2021.01); *H04W 12/041* (2021.01); *H04W 12/069* (2021.01); *H04W 60/04* (2013.01)

(58) Field of Classification Search
CPC . H04W 12/64; H04W 12/041; H04W 12/069; H04W 12/02; H04W 12/63;
(Continued)

(56) References Cited

U.S. PATENT DOCUMENTS

2006/0093138 A1   5/2006  Durand et al.
2016/0234176 A1*  8/2016  Chu .................... H04L 63/04
(Continued)

FOREIGN PATENT DOCUMENTS

EP    3410406 A1 * 12/2018   ......... G06K 7/10297
EP    3410406 A1    12/2018

OTHER PUBLICATIONS

Yohan, Alexander et al.; "An Indoor Positioning-Based Mobile Payment System Using Bluetooth Low Energy Technology"; IDS dated Apr. 29, 2021 (Year: 2018).*

(Continued)

*Primary Examiner* — Khoi V Le

(57) ABSTRACT

There is described a system and method of committing a transaction within a UWB network comprising a plurality of anchors, the UWB network covering a predetermined area having at least one trigger area, the method comprising waking up a mobile device upon entering the predetermined area, receiving initial network data at the mobile device, verifying that the UWB network is genuine based on the initial network data, initiating communication between the mobile device and an anchor, including partial mutual authentication, generating a session key for secure communication between the mobile device and the UWB network, tracking the location of the mobile device within the predetermined area based on secure communication between the mobile device and one or more anchors within the UWB network using the session key, and committing the transaction, if the location of the mobile device is within the at least one trigger area.

20 Claims, 2 Drawing Sheets

(51) Int. Cl.
*H04W 12/069* (2021.01)
*H04W 12/041* (2021.01)

(58) Field of Classification Search
CPC ... H04W 12/75; H04W 12/06; H04W 12/009; H04W 60/04; H04W 4/029; H04W 4/021; H04L 63/0869
See application file for complete search history.

(56) References Cited

U.S. PATENT DOCUMENTS

| | | | |
|---|---|---|---|
| 2016/0302037 A1* | 10/2016 | Jack | H04W 4/029 |
| 2020/0062217 A1* | 2/2020 | Ledvina | H04W 76/10 |
| 2020/0228331 A1 | 7/2020 | de Perthuis et al. | |
| 2021/0258308 A1* | 8/2021 | Avetisov | H04L 9/3234 |
| 2021/0312424 A1* | 10/2021 | Lee | G06Q 20/20 |
| 2021/0360395 A1* | 11/2021 | Lemsitzer | H04L 63/068 |
| 2022/0295276 A1* | 9/2022 | Yang | H04L 9/3271 |

OTHER PUBLICATIONS 802.15.8-2017 IEEE Standard for Wireless Medium Access Control (MAC) and Physical Layer (PHY) Specifications for Peer Aware Communications (PAC); Date of Publication Feb. 7, 2018; DOI: 10.1109/IEEESTD.2018.8287784.

NIST Special Publication 800-56A Revision 2; "Recommendation for Pair-Wise Key Establishment Schemes Using Discrete Logarithm Cryptography;" Publication Date May 2013.

Yohan, Alexander et al.; "An Indoor Positioning-Based Mobile Payment System Using Bluetooth Low Energy Technology"; Sensors, Received Feb. 24, 2018; Accepted Mar. 22, 2018; Published Mar. 25, 2018, vol. 18, No. 4; Sensors, Basel, Switzerland; DOI:10.3390/s18040974.

* cited by examiner

METHODS AND SYSTEMS FOR COMMITTING TRANSACTIONS UTILIZING RF RANGING WHILE PROTECTING USER PRIVACY

CROSS-REFERENCE TO RELATED APPLICATIONS

This application claims priority under 35 U.S.C. § 119 to European Patent Application No. 20290048.6, filed on May 28, 2020, the contents of which are incorporated by reference herein.

FIELD OF THE INVENTION

The present invention relates to the field of RF communication devices, in particular to RF communication devices capable of committing transactions by interacting with other systems while protecting user privacy. More specifically, the present invention relates to method of committing a transaction with a mobile device within a UWB network comprising a plurality of anchors, the UWB network covering a predetermined area having at least one trigger area. Furthermore, the present invention relates to a corresponding system.

ART BACKGROUND

RFID based technology is widely used for transit and access control systems. The user taps a card against a reader and a transaction occurs. These systems offer fairly good user privacy protection as the communication range is short (a few centimeters) and the cards can only be accessed when a user actually triggers an RFID transaction.

In order to improve usability convenience, it is contemplated to replace the short range RFID systems with RF technologies having less limited communication ranges, such as e.g. UWB (ultrawideband) technology. With such systems, where the range may be tens of meters, the transactions can become seamless as a user will not have to tap his tag/mobile against a reader anymore but merely move through a designated area. However, this facilitation comes with a price as it also gets much easier for an attacker to spy on transactions to attack the privacy of the user.

There may be thus be a need for a way of overcoming the drawbacks mentioned above.

SUMMARY OF THE INVENTION

This need may be met by the subject matter according to the independent claims. Advantageous embodiments of the present invention are set forth in the dependent claims.

According to a first aspect, there is provided a method of committing a transaction with a mobile device within a UWB (ultrawideband) network comprising a plurality of anchors, the UWB network covering a predetermined area having at least one trigger area, the method comprising (a) waking up the mobile device upon entering the predetermined area, (b) receiving initial network data at the mobile device, (c) verifying that the UWB network is genuine based on the initial network data, (d) initiating communication between the mobile device and an anchor within the UWB network, including partial mutual authentication, (e) generating a session key for secure communication between the mobile device and the UWB network, (f) tracking the location of the mobile device within the predetermined area based on secure communication between the mobile device and one or more anchors within the UWB network using the session key, and (g) committing the transaction, if the location of the mobile device is within the at least one trigger area.

This aspect is based on the idea that user privacy is protected in several ways during different stages of use: Initially, i.e. prior to the mobile device entering into actual communication with the UWB network, it is verified that the UWB network is genuine (as opposed to an attacker pretending to be part of a network with the aim of obtaining sensitive data from the mobile device). Thereafter, a session key is generated such that the location of the mobile device can be tracked utilizing secure (private) communication with the UWB network while moving within the predetermined area covered by the UWB network. This communication does not reveal any sensitive information to the network, it only allows the network to keep track of the device's location without knowing who the user is, payment information, and any other information that is not required to perform the tracking. Then, once it is determined that the mobile device is located within the at least one trigger area, e.g. when the user walks through a designated gate in a train station or similar facility, a transaction is committed. Only at this stage, sensitive information may be communicated from the mobile device to the UWB network as needed to commit the transaction. If the mobile device leaves the predetermined area without entering the trigger area, the session will be ended without the identity of the user being revealed to the UWB network. Hence, as long as the user does not decide to commit a transaction by entering the trigger area (or one of several trigger areas), the user stays completely anonymous to the UWB network.

In the present context, the term "mobile device" may particularly denote a compact electronic device, such as a smart phone, a tablet, a dedicated device, or the like that is compact and capable of communicating with an UWB network. More specifically, the mobile device may be loaded with a dedicated app for handling the communication.

In the present context, the term "anchor" may particularly denote a node in the UWB network, said node being capable of transmitting and receiving messages at least in the UWB frequency band.

In the present context, the term "predetermined area" may particularly denote an area within which it is possible to communicate with at least one anchor and thereby with the UWB network. It should be noted that the exact size and shape of the predetermined area also depends on the particular mobile device and its communication capabilities. In the present context, the term "trigger area" may particularly denote a limited and clearly marked area, such a gate, which a user may enter or pass through in order to indicate his or her willingness to commit a transaction, such as starting or ending a public transportation travel segment.

In the present context, the term "initial network data" may particularly denote data providing basic information on the network which allows a mobile device to identify the UWB network and to perform the first steps needed to initiate communication with the UWB network.

In the present context, the term "session key" may particularly denote a cryptographic key which can only be used in conjunction within a single communication session.

According to an embodiment, the step of verifying that the anchor is genuine comprises (a) determining a current location of the mobile device, (b) determining an expected location of the network, and (c) verifying that the current location of the mobile device matches the expected location of the network.

In other words, an expected location of the UWB network is determined and then it is checked whether the current location of the mobile device (provided e.g. by GPS, mobile network cells ID, nearby Wifi, etc.) fits the expected location of the UWB network. In one example, the expected location be determined to be a certain train station. Hence, if the mobile device is currently located within this train station or at least within the near surroundings thereof, the UWB network may be verified as being genuine. On the other hand, if the device location does not match the expected network location, this may be seen as an attempt at attacking the mobile device and the UWB network cannot be verified as genuine. If this occurs, the mobile device will not take further steps towards establishing communication with the non-genuine network.

According to a further embodiment, the expected location of the network is determined based on the initial network data and/or a database mapping at least a part of the initial network data to a location.

In other words, the expected location may be determined on the basis of information, such as a network ID, contained in the initial network data. This information may either directly give an indication of the expected location or it may be combined with a database that maps the information to a location.

According to a further embodiment, the initial network data is broadcast by the anchors.

Thus, shortly after entering the predetermined area, the mobile device will have received the initial network data such that it can start the verification step and, if this is successful, continue with the further steps.

According to a further embodiment, the communication is initiated using IEEE802.15.8 or a similar protocol.

According to a further embodiment, the method further comprises assigning a random ID to the mobile device for identifying the mobile device during the secure communication with the one or more anchors within the UWB network.

Hence, by using a random ID to identify the mobile during the communication session, the network can track the location of the mobile device as it moves around within the predetermined area. The next time the mobile device communicates with the UWB network (or with another UWB network at another location), it will be assigned a new random ID. Hence, it is not possible to track the actual device or its user.

According to a further embodiment, tracking the location of the mobile device comprises performing time of flight measurements for the communication between the mobile device and each of the one or more anchors.

The time of flight measurements provide information on the distance between the mobile device and each of the anchors participating in the communication with the mobile device. Using this information and triangulation techniques, the current position of the mobile device within the predetermined area can be determined.

According to a further embodiment, each of the one or more anchors sends a message to the mobile device and measures the time until a corresponding response is received from the mobile device.

According to a further embodiment, wherein the communication for performing the time of flight measurements utilizes UWB.

According to a further embodiment, the step of generating a session key comprises (a) generating an ephemeral device key at the mobile device while utilizing a static device key and its certificate for authentication, the ephemeral device key comprising an ephemeral device private key and an ephemeral device public key, (b) generating an ephemeral anchor key at the anchor while utilizing a static anchor key and its certificate for authentication, the ephemeral anchor key comprising an ephemeral anchor private key and an ephemeral anchor public key, (c) sharing the ephemeral device public key with the anchor, (d) sharing the ephemeral anchor public key and the static anchor key with the mobile device, (e) generating the session key at the mobile device based on the ephemeral anchor public key and the static device key, and (f) generating the session key at the anchor based on the ephemeral device public key and the static anchor key.

In other words, both the mobile device and the anchor generates a respective ephemeral key, i.e. an ephemeral device key and an ephemeral anchor key, respectively. Each ephemeral key comprises a private key and a public key. Furthermore, the mobile device and the anchor utilize their respective static keys and certificates for authentication purposes, i.e. to certify that they are who to they claim to be. Then, the mobile device shares the ephemeral device public key with the anchor. Due to the authentication, e.g. certification, the anchor trusts that the ephemeral device key is provided by the mobile device. Similarly, the anchor shares the ephemeral anchor public key with the mobile device. Furthermore, the anchor also shares its (public) static anchor key with the mobile device. Then, when both sides (i.e. the mobile device on one side and the anchor on the other side) have obtained the respective ephemeral public key from the other side, they generate the session key based on the ephemeral public key received from the other side and their own static key. This is also known as the principle of agreeing on a shared secret. Hence, the session key is only known and useful to the mobile device and the anchor and cannot be obtained, generated, or recreated by a third party.

According to a further embodiment, the method further comprises sharing the static device key with the anchor.

By sharing the static device key and its certificate (signed e.g. by a transit authority to prove that the device belongs to a group) it can be assured that nonmembers cannot connect to the anchor.

As indicated above, a key is always divided in two: public key and private key. What is shared is the public key. A public key can be signed by another key, generating a signature. If the signature is coming from a trusted $3^{rd}$ party, it is a certificate as anyone trusting the authority can check the public key (and other info) are vouched for by the authority.

According to a further embodiment, the static device key is shared with other mobile devices and stored within a secure execution environment of the mobile device.

By sharing the static device key with other mobile devices, it is possible to see the mobile devices as belonging to the same group, e.g. travel passes for a public transportation system. The static device key is protected by being stored within a secure execution environment, i.e. in a secure area of memory (hardware) and/or in a secure functional area (software).

According to a further embodiment, a public key and its certificate corresponding to the static anchor key are received at the mobile device during the step of initiating communication between the mobile device and the anchor, or they are retrieved from a database.

Thereby, the mobile device can authenticate the network and communicate with the network in a secure manner right from the beginning.

According to a further embodiment, committing the transaction comprises emulating a contactless card transaction between the mobile device and an anchor located within or in the vicinity of the trigger area.

In other words, the actual transaction is performed by exchanging data in the same way as when a user holds his or her RFID or NFC device to a reader in RFID-based systems. Hence, only at this stage is sensitive data exchanged between the mobile device and the UWB network.

According to a second aspect, there is provided a system comprising (a) a UWB network comprising a plurality of anchors, the UWB network covering a predetermined area having at least one trigger area, and (b) at least one mobile device configured to communicate with the UWB network, wherein the system is configured to: (c) wake up the mobile device upon entering the predetermined area, (d) receive initial network data at the mobile device, (e) verify that the network is genuine based on the initial network data and geofencing info from other sensors, (f) initiate communication between the mobile device and an anchor within the UWB network, including partial mutual authentication, (g) generate a session key for secure communication between the mobile device and the UWB network, (h) track the location of the mobile device within the predetermined area based on secure communication between the mobile device and one or more anchors within the UWB network using the session key, and (i) commit a transaction, if the location of the mobile device is within the at least one trigger area.

This aspect is essentially based on the same idea as the first aspect and provides a system capable of performing the method according to the first aspect and/or any of the embodiments discussed above.

According to a third aspect, there is provided a computer program comprising computer executable instructions which when executed by a computer causes the computer to perform the steps of the method according to the first aspect.

According to a fourth aspect, there is provided a computer program product comprising a computer readable data carrier loaded with a computer program according to the third aspect.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
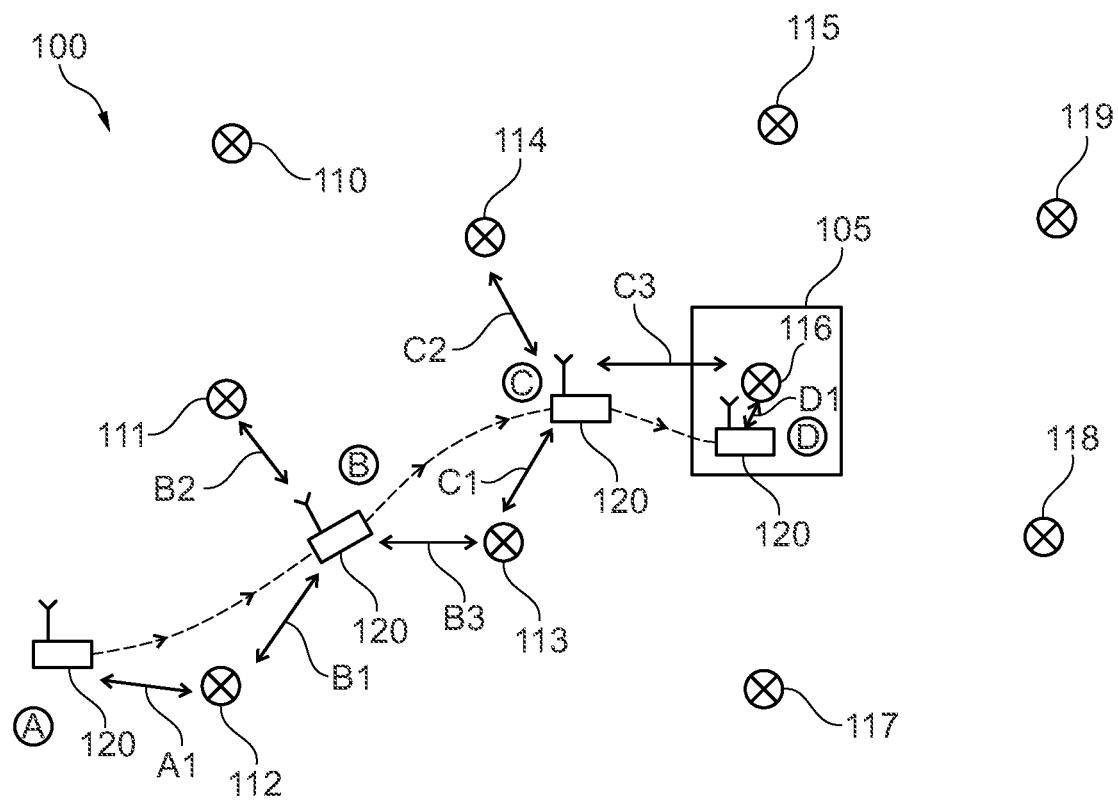
FIG. 1 shows a system in accordance with an exemplary embodiment.

The illustration in the drawing is schematic. It is noted that in different figures, similar or identical elements are provided with the same reference signs or with reference signs, which differ only within the first digit.

FIG. 1 shows a system 100 in accordance with an exemplary embodiment. The system 100 comprises a plurality of anchors 110, 111, 112, 113, 114, 115, 116, 117, 118, 119 arranged across a predetermined area to establish a UWB network covering said predetermined area. Within the predetermined area there is a designated trigger area 105. It should be noted that the limited number of anchors and the reference to only a single trigger area 105 purely serves to facilitate explanation of the embodiment. In other embodiments, the UWB network may contain tens or hundreds of anchors and as many trigger areas as needed to provide the desired functionality at a given location, such as a train station. The system 100 further comprises a mobile device 120, such as a smart phone loaded with an app for communicating with the UWB network and for committing transactions, such as checking in and out in a public transportation system.

FIG. 1 shows the (same) mobile device 120 at four different locations A, B, C, and D within the predetermined area. At location A (in the lower left corner), the mobile device 120 has just entered the predetermined area and is woken up and ready to connect with the UWB network via anchor 112 which, as indicated by the arrow A1, is within range of the mobile device 120. The wake-up may be initiated by a signal (such as a Wifi, BLE or another RF signal) broadcast by the anchor 112 and received by the mobile device 120, or by utilizing a geofencing info, based e.g. on GPS or Wifi/BLE. At this stage, the mobile device 120 also receives initial network data, which may include a unique network ID and/or a unique transit system ID as well as other information that may allow for faster connection (such as preferred RF transport layer parameters) and for providing additional proof, e.g. a timestamp. The additional proof must be authenticated, e.g. signed by a private anchor/network key. Then, before attempting to connect to the anchor 112, the mobile device 120 verifies that the UWB network (represented by the anchor 112 in this case) is genuine. This verification uses information in the initial network data, e.g. to determine an expected location of the UWB network and comparing it with the current location of the mobile device 120, obtained from a source such as GPS, cellular network cell ID, Wifi, etc. The determination of the expected location may utilize a database stored locally in the mobile device 120, e.g. provisioned and updated regularly, a database stored remotely and accessed via a trusted out of band connection, e.g. a cellular network, and/or information broadcast by the anchor 112. In every case, the information must be authenticated, e.g. via a secure connection or via public key cryptography. The information may also be timestamped, thereby allowing the device to confirm that the broadcast information and signature thereon is recent.

Only if this verification succeeds, the mobile device 120 initiates communication with the anchor 112 to start a session. This may be done using protocols described in IEEE802.15.8 and involves partial mutual authentication and assigning a random ID to the mobile device 120 for use during the session. As soon as a slot has been assigned, the mobile device 120 and the anchor 112 will generate a session key with partial authentication. This process may utilize one of several existing authentication schemes based on asymmetric cryptography. For maximum security against attackers (including devices of the same network), a scheme to generate an ephemeral key based on static and dynamic keys can be used (such as the one described in NIST Special Publication 800-56A: "Recommendation for Pair-Wise Key Establishment Schemes Using Discrete Logarithm Cryptography").

An exemplary process for generating the session key may include generating an ephemeral device key at the mobile device 120 while utilizing a static device key for authentication, and generating an ephemeral anchor key at the anchor 112 while utilizing a static anchor key for authentication. Then, the ephemeral device key is shared with the anchor 112 and the ephemeral anchor key and the static anchor key are shared with the mobile device 120. Finally, the session key is generated at the mobile device 120 based on the ephemeral anchor key and the static device key, and the session key is generated at the anchor 112 based on the ephemeral device key and the static anchor key. Now, both parties (i.e. the mobile device 120 and the anchor 112) have the session key (often referred to as "common secret") in their possession and can use it for secure communication throughout the session. Thereby, the following advantages are obtained: The session key is unknown to an eavesdropping adversary (based on the use and definition of a multi-party authentication scheme); the session key cannot be computed by and is unknown to a man-in-the-middle adversary; the session key proves the anchor identity and that the mobile device belongs to network; the key will be used to derive the keys used for the rest of the session.

Now, having established the session key, the mobile device 120 and the UWB network (initially the anchor 112) can communicate securely with each other during the session, in particular for tracking the location of the mobile device 120 within the predetermined area as the user moves away from the initial location A shown in the lower left corner of FIG. 1. As the mobile device 120 moves along towards the trigger area 105, it will respond to messages from the one or more anchors within its reach, such that the position of the mobile device 120 can be continuously obtained on the basis of corresponding time of flight measurements, i.e. by measuring the time from sending a message from an anchor until the same anchor receives a response from the mobile device 120. By applying triangulation and possibly other techniques to the repeatedly obtained distances from the corresponding anchors, not only the position but also the direction and/or speed of the moving device 120 can be tracked. FIG. 1 shows some further positions of the mobile device 120 along its route to the trigger area 105. In position B, the mobile device is connected to the anchors 112, 111 and 113 as indicated by corresponding arrows B1, B2, B3 while in position C further down the route, the mobile device 120 is connected to the anchors 113, 114 and 116 as indicated by corresponding arrows C1, C2 and C3. Finally, at position D, the mobile device has arrived within the trigger area 105 and now is now communication with anchor 116. Upon determining that the mobile device 120 is located within the trigger area 105, the mobile device commits a transaction, e.g. by emulating a contactless card transaction with the anchor 116. Only at this stage, as part of committing the transaction, the identity of the user is revealed to the system 100. Accordingly, if the user decided to not enter the trigger area 105 (or any other trigger area) and just leaved the predetermined area again, e.g. if he/she was simply walking through a train station, the system would track a random ID until end of the session without knowing the identity of the corresponding user.

Figure 2:
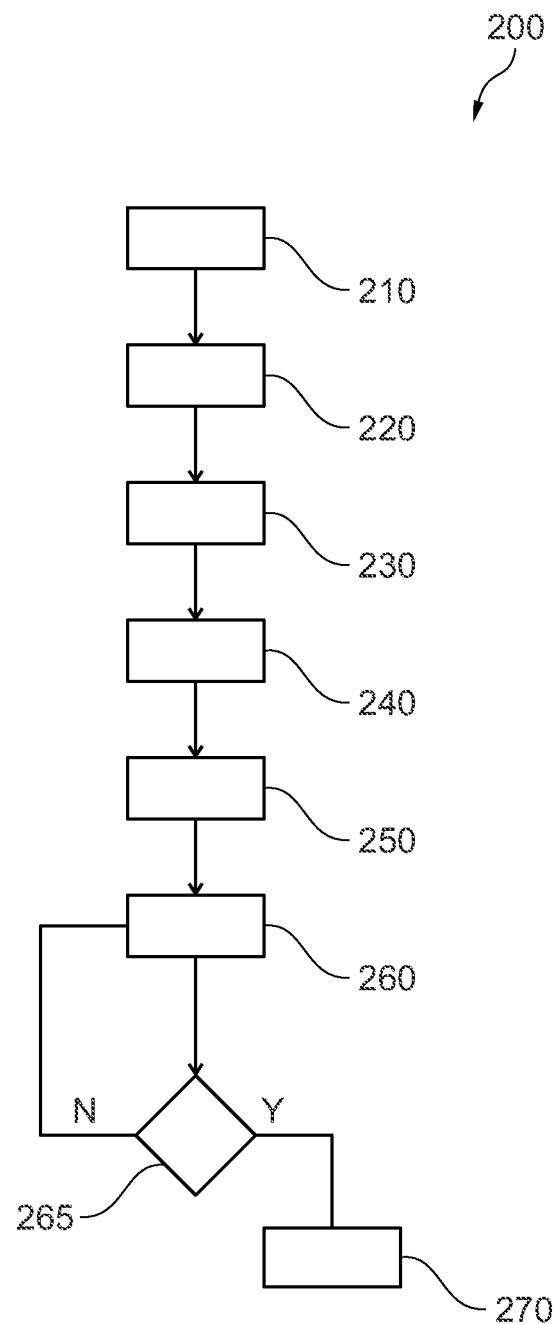
FIG. 2 shows a flowchart of a method in accordance with an exemplary embodiment.

FIG. 2 shows a flowchart 200 of a method in accordance with an exemplary embodiment. More specifically, the flowchart 200 shows similar steps as described above in conjunction with FIG. 1. The method 200 begins at 210 with waking up the mobile device 120 upon entering the predetermined area. Then, at 220, initial network data is received at the mobile device 120, and at 230, it is verified that that the UWB network is genuine based on the initial network data as described above. After verifying that the UWB network is genuine, communication between the mobile device 120 and an anchor within the UWB network is initiated. This step also includes partial mutual authentication of mobile device 120 and anchor. At 250, a session key for secure communication between the mobile device 120 and the UWB network is generated, and once this is done, the location of the mobile device 120 within the predetermined area is determined at 260 utilizing secure communication between the mobile device 120 and one or more anchors within the UWB network using the session key. At 265, it is checked whether the location of the mobile device 120 is within the trigger area 105. If this is not the case, N, the method returns to step 260 where the position of the mobile device 120 is updated. On the other hand, if the position is determined to be within the trigger area 105, Y, a transaction is committed at 270.

The transaction will occur over the same channel as used for ranging or a separate one. The transaction will emulate a RFID transaction over the selected transport channel. User identity will be disclosed as in a typical RFID transaction.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Furthermore, elements described in association with different embodiments may be also combined. It should also be noted that reference signs in the claims should not be construed as limiting the scope of the claims.

The invention claimed is:

1. A method of committing a transaction with a mobile device within a ultra-wideband (UWB) network comprising a plurality of anchors, the UWB network covering a predetermined area having at least one trigger area, the method comprising:
   waking up the mobile device upon entering the predetermined area,
   receiving initial network data at the mobile device,
   verifying that the UWB network is genuine based on the initial network data,
   initiating communication between the mobile device and an anchor within the UWB network, including partial mutual authentication,
   generating a session key for secure communication between the mobile device and the plurality of anchors in the UWB network,
   tracking, by the UWB network, a location of the mobile device within the predetermined area based on secure communication between the mobile device and one or more anchors within the UWB network using the session key, and
   committing the transaction, if the location of the mobile device is within the at least one trigger area.

2. The method according to claim 1, wherein verifying that the anchor is genuine comprises:
   determining a current location of the mobile device,
   determining an expected location of the network, and
   verifying that the current location of the mobile device matches the expected location of the network.

3. The method according to claim 2, wherein the expected location of the network is determined based on the initial network data or a database mapping at least a part of the initial network data to a location.

4. The method according to claim 1, wherein the initial network data is broadcast by the anchors.

5. The method according to claim 1, wherein the communication is initiated using IEEE 802.15.8 or a similar protocol.

6. The method according to claim 1, further comprising assigning a random ID to the mobile device for identifying the mobile device during the secure communication with the one or more anchors within the UWB network.

7. The method according to claim 1, wherein tracking the location of the mobile device comprises performing time of flight measurements for the communication between the mobile device and each of the one or more anchors.

8. The method according to claim 7, wherein each of the one or more anchors sends a message to the mobile device and measures the time until a corresponding response is received from the mobile device.

9. The method according to claim 7, wherein the communication for performing the time of flight measurements utilizes UWB.

10. The method according to claim 1, wherein generating a session key comprises:
    generating an ephemeral device key at the mobile device while utilizing a static device key and its certificate for authentication, the ephemeral device key comprising an ephemeral device private key and an ephemeral device public key,
    generating an ephemeral anchor key at the anchor while utilizing a static anchor key and its certificate for authentication, the ephemeral anchor key comprising an ephemeral anchor private key and an ephemeral anchor public key,
    sharing the ephemeral device public key with the anchor,
    sharing the ephemeral anchor public key and the static anchor key with the mobile device,
    generating the session key at the mobile device based on the ephemeral anchor public key and the static device key, and
    generating the session key at the anchor based on the ephemeral device public key and the static anchor key.

11. The method according to claim 10, further comprising sharing the static device key with the anchor.

12. The method according to claim 11, wherein the static device key is shared with other mobile devices and stored within a secure execution environment of the mobile device.

13. The method according to claim 10, wherein a public key and its certificate corresponding to the static anchor key are received at the mobile device during the step of initiating communication between the mobile device and the anchor, or they are retrieved from a database.

14. The method according to claim 1, wherein committing the transaction comprises emulating a contactless card transaction between the mobile device and an anchor located within or in a vicinity of the trigger area.

15. A system comprising:
    a ultra-wideband (UWB) network comprising a plurality of anchors, the UWB network covering a predetermined area having at least one trigger area, and
    at least one mobile device configured to communicate with the UWB network,
    wherein the system is configured to:
    wake up the mobile device upon entering the predetermined area,
    receive initial network data at the mobile device,
    verify that the network is genuine based on the initial network data,
    initiate communication between the mobile device and an anchor within the UWB network, including partial mutual authentication,
    generate a session key for secure communication between the mobile device and the plurality of anchors in the UWB network,
    track, by the UWB network, a location of the mobile device within the predetermined area based on secure communication between the mobile device and one or more anchors within the UWB network using the session key, and
    commit a transaction, if the location of the mobile device is within the at least one trigger area.

16. The system according to claim 15, further configured to verify that the anchor is genuine based on the initial network data by:
    determining a current location of the mobile device,
    determining an expected location of the network, and
    verifying that the current location of the mobile device matches the expected location of the network.

17. The system according to claim 15, wherein the anchors are configured to broadcast the initial network data.

18. The system according to claim 15, further configured to track the location of the mobile device by performing time of flight measurements for the communication between the mobile device and each of the one or more anchors utilizing UWB communication.

19. The system according to claim 15, further configured to generate the session key by:
    generating an ephemeral device key at the mobile device while utilizing a static device key and its certificate for authentication, the ephemeral device key comprising an ephemeral device private key and an ephemeral device public key,
    generating an ephemeral anchor key at the anchor while utilizing a static anchor key and its certificate for authentication, the ephemeral anchor key comprising an ephemeral anchor private key and an ephemeral anchor public key,
    sharing the ephemeral device public key with the anchor,
    sharing the ephemeral anchor public key and the static anchor key with the mobile device,
    generating the session key at the mobile device based on the ephemeral anchor public key and the static device key, and
    generating the session key at the anchor based on the ephemeral device public key and the static anchor key.

20. The system according to claim 15, further configured to commit the transaction by emulating a contactless card transaction between the mobile device and an anchor located within or in a vicinity of the trigger area.

* * * * *